United States Patent [19]

Resslar

[11] Patent Number: 4,665,738

[45] Date of Patent: May 19, 1987

[54] ACCELERATED SOLVENT RESISTIVITY TEST

[75] Inventor: John J. Resslar, Utica, Mich.

[73] Assignee: United Technologies Automotive, Inc., Dearborn, Mich.

[21] Appl. No.: 775,082

[22] Filed: Sep. 12, 1985

[51] Int. Cl.$^4$ .................. G01M 3/00; G01N 21/91
[52] U.S. Cl. ............................................ 73/104; 73/52
[58] Field of Search ............... 73/104, 432 SD, 52, 73/865.6; 250/302; 436/3, 5; 252/301.19, 408.1

[56] References Cited

U.S. PATENT DOCUMENTS

| | | |
|---|---|---|
| 1,995,699 | 3/1935 | Baker et al. ........................... 73/52 |
| 3,341,010 | 9/1967 | Switzer ............................... 73/104 X |
| 3,406,285 | 10/1968 | Scorgie et al. ..................... 73/104 X |
| 3,490,873 | 1/1970 | Corl ............................... 73/104 U X |
| 3,509,762 | 5/1970 | Conway et al. ....................... 73/104 |
| 3,546,127 | 12/1970 | Fijalkowski ....................... 73/104 X |
| 3,567,651 | 3/1971 | Giles et al. ....................... 250/302 X |
| 3,580,066 | 5/1971 | Pliskin et al. ....................... 73/104 X |
| 3,671,183 | 6/1972 | Molina . |
| 3,738,158 | 6/1973 | Forrell et al. ....................... 73/52 X |
| 3,753,647 | 8/1973 | Molina ....................... 252/301.19 X |
| 3,762,216 | 10/1973 | Mendoza ............................... 73/104 |
| 3,926,044 | 12/1975 | Alburger ............................... 73/104 |
| 4,116,634 | 9/1978 | Nieberlein ....................... 73/104 X |
| 4,414,844 | 11/1983 | Rawal ............................... 73/104 |
| 4,510,798 | 4/1985 | Prussin et al. ..................... 73/104 X |

FOREIGN PATENT DOCUMENTS

| | | | |
|---|---|---|---|
| 54583 | 4/1979 | Japan ........................ 73/52 |
| 127823 | 8/1982 | Japan ........................ 73/52 |
| 224242 | 2/1943 | Switzerland ............... 73/104 |
| 878751 | 10/1961 | United Kingdom ........ 73/104 |
| 933896 | 8/1963 | United Kingdom ........ 73/104 |
| 1135408 | 12/1968 | United Kingdom ........ 73/104 |
| 431440 | 6/1975 | U.S.S.R. ................... 73/104 |

OTHER PUBLICATIONS

"Equipment for Testing the Splash Proofing of Instruments"; Soviet Instrumentation and Control J. (GB); No. 2; pp. 69-70; Feb. 1971; K. Z. Urazaev.

*Primary Examiner*—Stewart J. Levy
*Assistant Examiner*—Tom Noland
*Attorney, Agent, or Firm*—William J. Sapone; John Swiatocha

[57] ABSTRACT

A method for testing electronic assemblies for resistivity to fluorocarbon solvent permeation. After attaching electronic components on host boards, sample assemblies are selected for testing. Fluorocarbon solvent is added to a container suitably sized to allow complete immersion of the samples. Fluorescent dye is added to the solvent and the solvent dye solution heated to the boiling point. Samples are immersed in the solution and initial time noted. The samples are withdrawn after a predetermined time interval, dried and wiped clean to remove excess solvent/dye from the outside of the components. The electronic assemblies are disassembled and illuminated by ultraviolet light. If dye is observed in an area thought to have been sealed, fluorocarbon solvent permeation is proven.

9 Claims, No Drawings

ACCELERATED SOLVENT RESISTIVITY TEST

DESCRIPTION

1. Technical Field

This invention relates to methods for testing electronic assemblies, and more particularly, to methods for testing electronic assemblies for resistivity to fluorocarbon solvent permeation.

2. Background Art

Since the mid-1960s, electronic apparatus have found growing application in such products as computers, communications equipment and control systems. These apparatus have increased in complexity with greater reliance placed on the integrated circuit assemblies employed therein. Integrated circuit assemblies form the basic building blocks of such electronic apparatus and consist generally of various components such as transistors, resistors, capacitors and other devices arranged on a circuit board. These boards comprise layers of alternating electrically conductive and nonconductive material with current flow paths etched within the boards to provide interconnection of components. The functional result desired determines the layout of the paths and the number, type, and arrangement of components.

Integrated circuit reliability, defined as the probability that an integrated circuit will function as intended during its expected life, depends on the reliability of the individual components. Should even a single component such as a transistor or capacitor fail, the integrated circuit will not function as intended. Among the causes of component failure are improper construction of the individual component or improper attachment of the component to the host board. Therefore, after various stages in the manufacture of integrated circuit assemblies, testing must be done to detect defective assemblies. The testing procedures must be thoroughly, yet minimally disruptive to production timetables.

A prime concern during integrated circuit assembly is proper cleaning. Components are attached to a host board by various methods such as soldering or welding. Residues, typically soldering fluxes or ionic metal salts, may remain after assembly and can upset the delicate conductive/insulative properties of the board materials. Consequently, clean assemblies are critical to reliability.

Electronic industry standard practice requires cleaning the assemblies with a fluorocarbon solvent. This is accomplished by either solvent spraying, suspension in a solvent vapor blanket or immersion of the assemblies in boiling solvent. Automated conveyor assembly lines incorporate machines which may use all three methods. The fluorocarbon solvent dissolves the fluxes and other ionic residues without harming the board or components. During cleaning, however, fluorocarbon solvent may permeate into improperly sealed components, remaining within the components during subsequent inclusion in electronic apparatus. If during later use, moisture similarly permeates into the components, the trapped fluorocarbon solvent will react with the moisture to form hydrofluoric acid. This acid can cause destructive corrosion of the components with failure of the entire integrated circuit assembly.

The known tests for fluorocarbon solvent permeation are primarily use tests. Sample integrated circuit assemblies are held for approximately 1000 hours after cleaning in a higher temperature, pressure or humidity environment than would be encountered in normal operation. The assemblies are parametrically tested before and after the 1000 hours, with excess variation in characteristic response constituting failure.

Such prior art use tests have several limitations. First, the tests do not directly prove fluorocarbon solvent permeation. Characteristic response may deviate for reasons other than fluorocarbon solvent corrosion. Conversely, even if permeation occurs, the characteristic response may appear correct if 1000 hours is insufficient for moisture to permeate into the components. An electronic apparatus constructed with such an assembly may fail after 1500 or 2000 hours due to fluorocarbon solvent corrosion. Second, following the use test, large inventories of electronic assemblies must be stored for more than a month while test facilities are processing hundreds of samples at rigid environmental conditions. This results in high testing and warehousing costs, significant investments in inventory and complex production scheduling. Third, component manufacturers, in an effort to increase production and reduce costs, have shifted from epoxy-type component seals to gasket-type component seals. This change has lessened the components resistance to liquid permeation, increasing the number of defective assemblies. Since use tests do not test directly for fluorocarbon solvent permeation, a larger number of defective assemblies are likely to survive the use test and cause failure of subsequently manufactured electronic apparatus.

Consequently, a need has developed for a direct testing method which specifically proves fluorocarbon solvent permeation and which provides accelerated test results.

DISCLOSURE OF INVENTION

An object of this invention is to provide a direct method for testing electronic assemblies specifically for fluorocarbon solvent permeation.

It is a further object of the present invention to provide a test method which generates accelerated test results, minimizing production delays.

According to this invention, after constructing a group of electronic assemblies and before the cleaning thereof, a number of sample assemblies are contacted with a mixture of fluorocarbon solvent and dye. These samples are removed from exposure to the mixture after a predetermined time, wiped clean, disassembled and the component parts inspected. If traces of the dye appear in an area thought to have been sealed, solvent permeation is indicated and the group of assemblies set aside for repair and retesting.

BEST MODE FOR CARRYING OUT THE INVENTION

Typical components subject to fluorocarbon solvent permeation in the manufacture of integrated circuit assemblies, are aluminum electrolytic capacitors. In a conventional manufacturing process, such capacitors are soldered to a host board and the resulting assembly washed with fluorocarbon solvent. While such a capacitor is preferred for illustrating the present invention, this invention has application wherever electromechanical devices or electronic components are attached to a host board, by soldering or the like, and subsequently cleaned by a fluorocarbon solvent.

After electronic components are attached to a host board, samples of the component-board assemblies are collected for testing. After 2–20 assemblies per 100 may be tested (2.0%–20.0%). This number will vary with the type of component involved, probability of permeation and method of disassembly (destructive vs. nondestructive). For electrolytic capacitor assemblies, about 8 samples per 100 are taken (8.0%).

Fluorocarbon solvent such as trifluorotrichlorethane is added to a container suitably sized to allow complete immersion of the samples. While other methods of contacting the sample assemblies with solvent such as solvent spraying or suspension in a solvent vapor blanket, are possible, total immersion is the harshest method of cleaning and, therefore, the best environment for testing assemblies. Fluorescent dye is then added to the solvent—about 0.1%–2.0% dye by volume. Above 2.0%, detection is not enhanced, while below 0.1% the dye is undetectable. Generally, about 1.0% is preferred. While a yellow-green fluorescent type dye such as that sold under the trademark "Tracer Yellow" by Day Glow Corporation has been used successfully, any dye suitably soluble in the fluorocarbon cleaning solvent may be used. Fluorescent type dye is preferred because fluorescence intensifies the visibility of the dye, minimizing potential testing errors. The solvent/dye solution is then heated to a temperature at which the solvent is applied in the actual cleaning process. Generally, the solvent/dye mixture is heated to between 35° and 50° C., which simulates the actual range of cleaning temperatures. For electrolytic capacitor assemblies, the solvent/dye solution is heated, such as by a laboratory hot plate, to the boiling point of the fluorocarbon solvent. Using trifluorotrichlorethane, this is about 47° C. (118° F.).

When the solvent/dye solution is sufficiently heated, all the samples are added to the solution and the initial time noted. The test time corresponds to actual production cleaning time. Ten to twelve minutes is typical for cleaning electrolytic capacitor assemblies. For this test, 20 minutes is chosen to assure that any potential to solvent permeation is realized.

Statistical variations may be employed as part of the test method. For example, all the samples can be immersed for the full 20 minutes or samples can be withdrawn at intermediate times such as by removing a fraction of assemblies at evenly spaced time intervals. In the preferred method, samples are sequentially withdrawn from the fluorocarbon solvent at 5 minute intervals; two each at 5, 10, 15 and 20 minutes. At least two samples are removed per interval to increase the statistical reliability of the results. With such sequential withdrawal, the rate of solvent permeation may be tracked with time, thereby indicating the location of penetration and degree of solvent permeation. This information is valuable in determining a solution to any observed permeation problem.

After withdrawal, the samples are dried and wiped clean to remove excess dye from the outside of the components. This prevents contamination during disassembly. A cloth with isopropyl alcohol may be used for cleaning the samples. The components are then disassembled into their component parts and the parts are visually inspected for presence of the dye. This generally requires a microscope or other such equipment due to the miniaturized nature of electronic components. With a fluorescent type dye, ultraviolet light is used to illuminate the parts, thereby enhancing the ease with which solvent/dye permeation is detected. If dye is observed in an area thought to have been sealed, fluorocarbon solvent permeation is proven and the group of assemblies from which the samples were taken set aside for inspection, and if necessary, repair and retesting. If no dye is observed, the group of assemblies is subsequently cleaned and used in the manufacturing process.

This method is very effective in determining fluorocarbon solvent permeation. During the evaluation of this method, electronic assemblies which survived a use test were retested according to this invention. Defective assemblies were discovered, demonstrating the inadequacy of prior art use tests. In addition to increasing the reliability of electronic apparatus, inventories are reduced and production scheduling improved because assemblies are held for significantly shorter time periods than those required by use tests. With this method, the test results are attained about an hour after the test has begun as opposed to time periods on the order of 1000 hours associated with prior art use tests. Fluorocarbon solvent permeation is established by direct observation as opposed to prior art methods wherein permiation is not observed but determined by deviation from performance standards.

While the preferred embodiment is described in relation to an electrolytic capacitor, it will be understood by those skilled in the art that this invention is applicable whenever fluorocarbon solvent cleaning of electronic or electromechanical assemblies is required. Accordingly, modifications in terms of test time, dye quantity or type, component device or method of disassembly can be made without varying from the scope of the present invention.

We claim:

1. A method for testing electronic assemblies for resistivity to fluorocarbon solvent permeation characterized by:
   (a) providing a solution of from 98.0%–99.9% by volume fluorocarbon solvent and from 0.1%–2.0% by volume dye;
   (b) selecting a representative number of electronic assemblies for testing;
   (c) contacting said selected electronic assemblies with said solvent/dye solution, in a manner generally simulating fluorocarbon solvent cleaning of said assemblies;
   (d) removing said electronic assemblies from contact with said solvent/dye solution;
   (e) disassembling said electronic assemblies into their component parts; and
   (f) inspecting said component parts for presence of said solvent/dye solution.

2. The method of claim 1 characterized by said dye comprising a fluorescent type dye, and by said component parts being illuminated under ultraviolet light during the inspection thereof.

3. The method of claim 2 characterized by said fluorescent dye being yellow-green in color.

4. The method of claims 1 or 2 characterized by said solution comprising 99.0% by volume solvent and 1.0% by volume dye.

5. The method of claims 1 or 2 characterized by said representative number of electronic assemblies comprising 2.0%–20.0% of said electronic assemblies.

6. The method of claims 1 or 2 characterized by said representative number of electronic assemblies comprising 5.0%–10.0% of said assemblies.

7. The method of claims 1 or 2 characterized by sequentially removing from said solution contact, a predetermined fraction of said selected assemblies at generally evenly spaced timed intervals.

8. The method of claims 1 or 2 characterized by said contacting comprising immersion in said solvent/dye solution.

9. The method of claims 1 or 2 characterized by said solvent/dye solution being heated to 35°–50° C. before contacting said assemblies.

* * * * *